Figure 1:
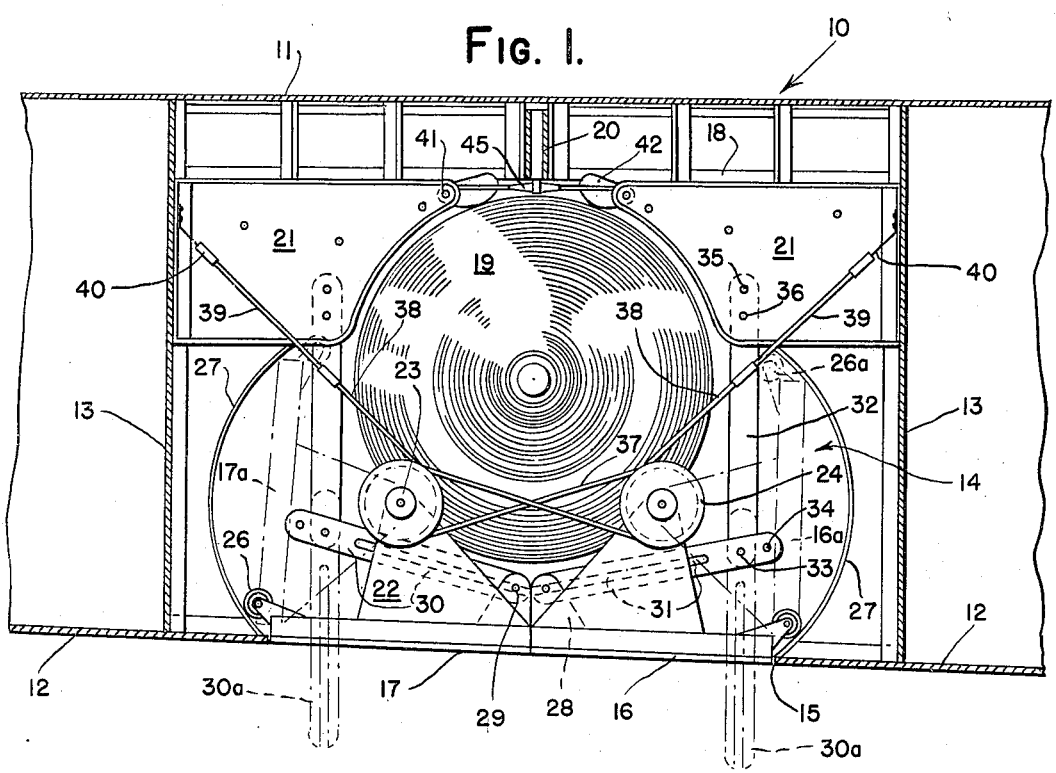
Figure 2:
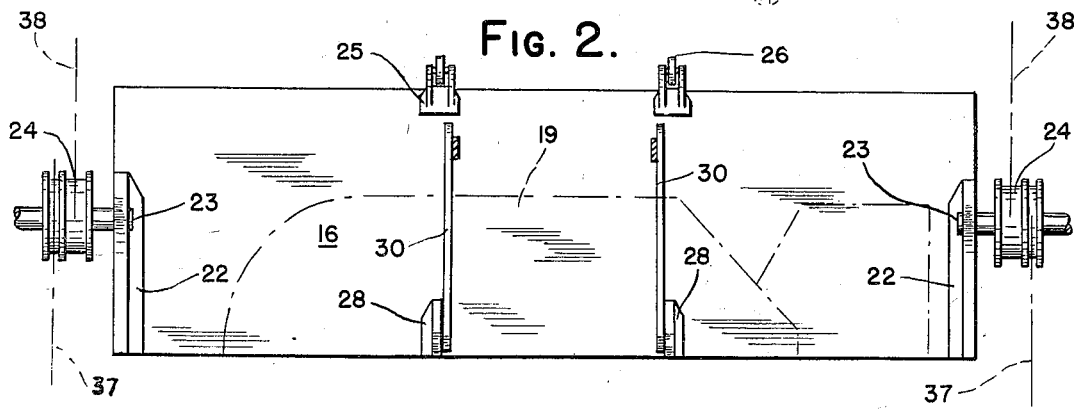
Figure 3:
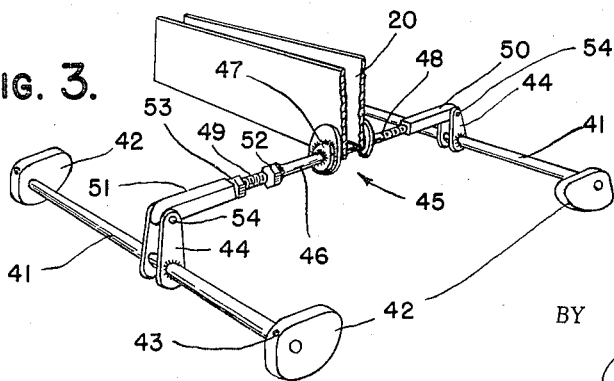

Feb. 27, 1945.    T. P. HALL    2,370,307
RELEASABLE LOAD COMPARTMENT FOR AIRCRAFT
Filed Oct. 25, 1940    2 Sheets-Sheet 1

INVENTOR.
THEODORE P. HALL.
BY *James M. Clark*
HIS ATTORNEY.

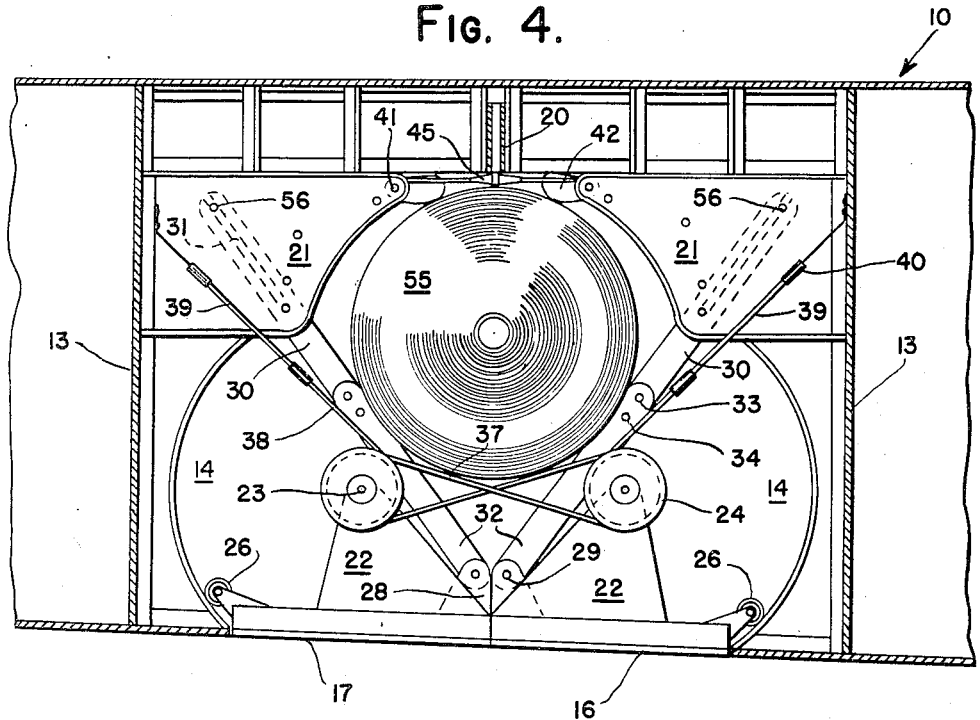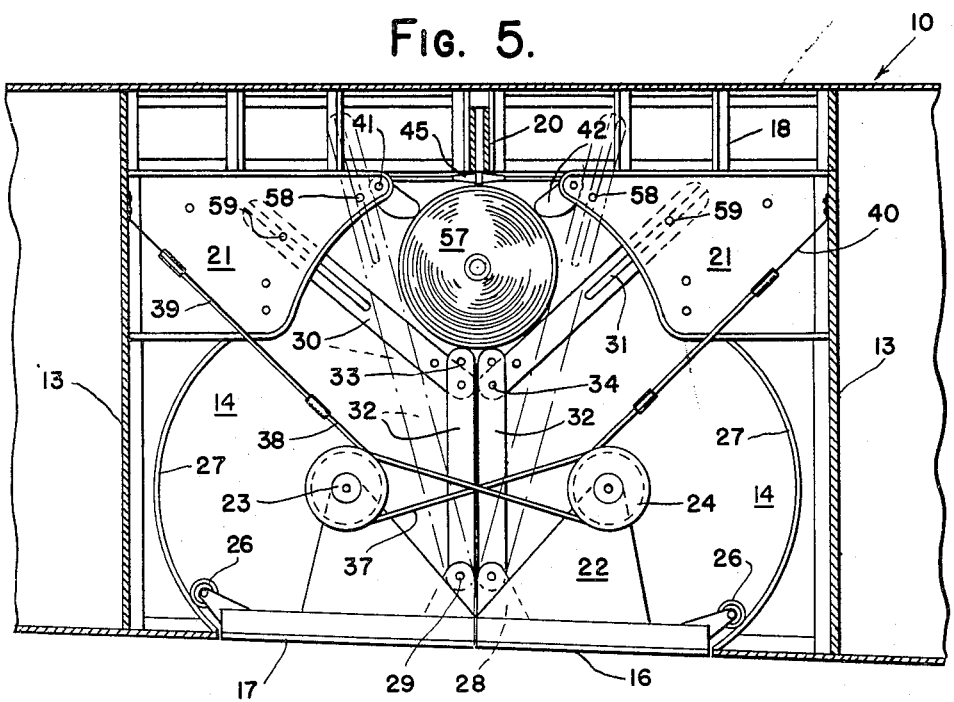

cause rotation of said member about said axis and uncovering of said opening.

4. In an aircraft having an opening in an exterior surface thereof, a closure for said opening comprising a member pivotally carried by the aircraft structure on an axis passing above the center of gravity of said closure in its normally closed attitude, fixed guide means arcuately disposed with respect to said axis, guide engaging means carried by said member, actuating means pivotally associated with said member adapted to cause rotation of said member about said axis and uncovering of said opening and tension means for restoring said member to its closed position.

5. In an aircraft bomb carrying arrangement adaptable for the accommodation of bombs of varying diameters, a bomb compartment adjacent a lower surface of said aircraft having an opening therein, means for releasably supporting a bomb load in longitudinal disposition, a pair of closure elements for said opening journalled upon longitudinal axes inwardly disposed from the said closure elements and adapted upon rotation about said axes to uncover and close said lower surface opening, means for separately actuating each closure element comprising link assemblies pivotally connected to their respective closure elements and disposed in the path of movement of said bomb load whereby said means is adapted, when subjected to the weight of said bomb, to rotate said closure elements into their open positions and arcuate guides within said compartment in contact with the closure elements to provide support reaction thereto against the released weight of said bomb load.

6. The arrangement described in claim 5, defined by a disposition of said link assemblies forming a U-shaped arrangement for the largest bombs to be accommodated, a V-shaped arrangement for accommodating intermediate sizes of bombs and a Y-shaped arrangement for the accommodation of the smaller sizes of bombs.

7. The combination with an aircraft, a compartment within the aircraft accessible through an opening in the plane of the exterior surface of said aircraft, and a load releasably carried within said compartment such that upon release it falls by gravity through said opening, of closure elements for said opening in the plane of said surface pivotally mounted upon said aircraft upon axes spaced above said surface and the center of gravity of the respective elements, mounting means disposed between said closure elements and said aircraft adapted to restrain and guide movement of said closure elements, and actuating means movably supported upon said aircraft interposed between said load and said closure elements adapted upon engagement by said gravitationally falling load to impart outward and upward bodily movement of said closure elements to retracted positions within said aircraft compartment thereby permitting said load to pass unobstructedly through said opening in said aircraft surface.

8. In an aircraft having a compartment opening into the undersurface thereof, said aircraft undersurface being subjected to external pressure induced by forward flight, a closure for said opening comprising a member pivotally carried by the aircraft upon an axis passing above the center of gravity of said closure in its normally closed attitude in which it is gravitationally suspended and forms a smooth and faired continuation of said undersurface, the said axis being symmetrically disposed with respect to the fairing surface of said closure whereby in normal flight the external pressure upon said fairing surface is substantially balanced such that the closure may be readily actuated.

9. In aircraft construction in combination, a compartment within the aircraft, a load releasably supported from said aircraft within said compartment, dual closure elements for said compartment pivotally suspended from said aircraft upon separate axes disposed spatially above the mid-portions of said elements, actuating means of linkage form pivotally connected to the aircraft and operatively connected to said closure elements, said actuating means disposed beneath said load and adapted to be and contacted and moved downwardly thereby upon release thereof, coordinating means interconnecting said closure elements such that they are retracted in unison outwardly and upwardly into said compartment, restoring means in cooperative engagement with said coordinating means adapted to derive and store energy from the downward movement of said load for the automatic closing of said closure elements and means fixedly carried by each of said closure elements adapted for engagement by said coordinating and restoring means.

10. A bomb chock installation for an aircraft having a wing, a bomb-carrying compartment comprising an interior space adjacent an opening in the lower surface of said wing, a bomb release gear carried by said wing, bracket elements supported from said wing extending in opposed relationship and terminating at each side of said release gear, and a bomb supported from said release gear and disposed between said bracket elements, comprising an adjustable chocking assembly extending between and journalled within each of the said bracket members, said chocking assembly including movable bomb-contacting elements, a normally rigid adjustable interconnection extending between the said bomb-contacting elements adjacent each said bracket and bearing element spaced from the midpoint of said interconnection engaging said bomb supporting means whereby the said chocking assembly is automatically self-centered with respect to said bomb in each of the adjusted positions of said interconnection.

11. In an aircraft wing having an opening in its lower surface, a closure element for said opening adapted to fit within said opening in a flush and continuous relationship with the adjacent lower surface of said wing, said wing lower surface being subjected to positive air pressure induced by forward flight, upwardly extending bracket means carried by said closure element, said bracket means being pivotally carried by the internal structure of said wing on an axis extending above and directly over the center of said air pressure upon said closure element and substantially in the direction of flight of said aircraft whereby the wing forming surface of said closure element is substantially aerodynamically balanced and gravitationally suspended in its closed position.

12. In an aircraft closure installation, a bomb compartment comprising an interior space adjacent an opening in the lower surface of said aircraft, said aircraft surface being subjected to position air pressure induced by forward flight, means for releasably supporting a bomb in longitudinal disposition in said compartment, a closure for said opening adapted to fit thereon with its lower surface flush and continuous with said lower surface of said aircraft, and upwardly extending bracket means carried by said closure pivotally supported by the internal structure of said aircraft on a longitudinal axis extending substantially above and laterally centered with respect to the center of air pressure upon said closure whereby the surface of said closure is substantially aerodynamically and mechanically balanced in its gravitationally suspended closed position and when rotated about said pivotal support is displaced laterally and upwardly into the interior of said compartment.

Feb. 27, 1945.       W. A. RAY       2,370,326
THERMOCOUPLE
Filed Oct. 20, 1941       2 Sheets-Sheet 1
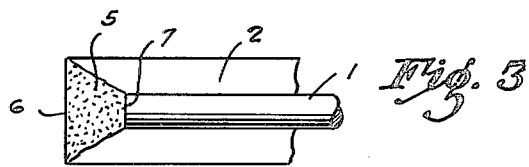
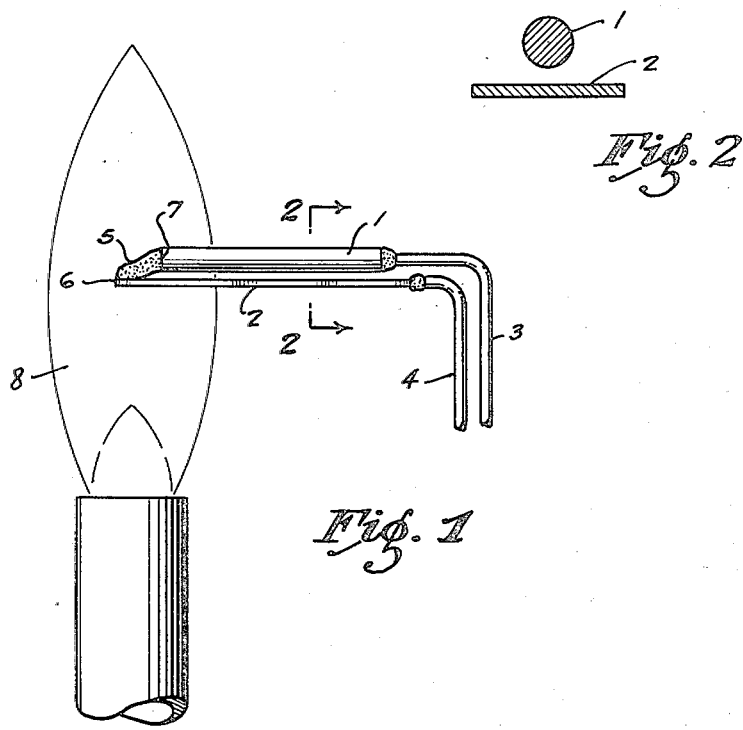
INVENTOR
William A. Ray
BY John Flam
ATTORNEY